United States Patent Office 2,904,597
Patented Sept. 15, 1959

2,904,597

BENZENE HEXACHLORIDE MANUFACTURE

Otto Theodore Aepli, Wyandotte, Mich., assignor to Pennsalt Chemicals Corporation, a corporation of Pennsylvania No Drawing. Application February 17, 1953
Serial No. 337,445

2 Claims. (Cl. 260—648)

This invention is concerned with the separation of isomers of hexachlorocyclohexane—more commonly known as benzene hexachloride. More particularly, it is concerned with continuous liquid-liquid countercurrent extraction processes for the separation of benzene hexachloride isomers.

Benzene hexachloride may be manufactured by the substitution chlorination of cyclohexane or by the addition chlorination of benzene, the latter generally being used in commercial processes. The addition chlorination of benzene, which is usually carried out in the presence of ultraviolet light, produces benzene hexachlorides in stereo-isomeric form, six being known at present. They are designated as alpha, beta, gamma, delta, epsilon, and zeta. A small amount of chlorine substituted hexachlorocyclohexanes are also usually produced in the reaction. These materials are commonly called overchlorinates. In the usual commercial process the gamma isomer of benzene hexachloride, which is the isomer valued for its insecticidal properties, is formed at a concentration of 10 to 14% of the total isomers present. Benzene hexachloride processes for producing gamma benzene hexachloride in this concentration are disclosed in U.S. Patent 2,010,841 and British Patent 573,689. In another commercial process, described in U.S. Patent 2,569,677, a benzene hexachloride product containing 25 to 50% gamma isomer is produced.

There are many processes for enhancing the gamma isomer content of crude benzene hexachloride and for producing a relatively pure gamma isomer. One of these processes provides for the leaching of crude benzene hexachloride with particular solvents, such as methanol, toluene or carbon tetrachloride whereby preferential solution of the gamma, beta, delta, and epsilon isomers of benzene hexachloride takes place. The alpha isomer is separated by filtration from the solution and subsequent crystallizations of the solution are required to effect separation of a relatively pure gamma isomer.

Another process provides for the steam distillation of part of the solvent from a solution of crude benzene hexachloride followed by a filtration of the precipitated crystals. The mother liquor is again concentrated by the evaporation of part of the solvent, after which a crystal crop is obtained by cooling the concentrate. The resulting material is filtered, and the crystals dried to produce a gamma-rich product.

Another process provides for the leaching of crude benzene hexachloride with cold isopropyl alcohol to remove a portion of the delta isomer along with some impurities. The residual crystal phase is then leached with chloroform and washed three times with the same solvent to produce an alpha-gamma enriched extract while an alpha-beta enriched solid is separated by filtration. The chloroform extract is then concentrated by evaporation, after which it is cooled so that crystallization of a mixture of alpha and gamma crystals takes place. The crystals are filtered and dried and a separation of the gamma isomer from the alpha isomer is made possible by the difference in their particle size in a screening operation.

The processes discussed above, as well as other prior art processes, are subject to particular disadvantages. For example, the processes depending on crystallization operations, which are usually batchwise, require a large investment for auxiliary refrigeration, filtration, and drying equipment. Moreover, the many unit operations usually require a large number of men to operate with a resulting high product cost. Also it is difficult to get a sharp separation of the isomers in a crystallization process and relatively impure products generally result. The process providing for steam distillation of the crude benzene hexachloride followed by crystallization processes is subject to the same disadvantages. The process providing for two leachings, three filtrations, an evaporation, drying, and screening operation would appear to be prohibitive for commercial manufacture due to its obvious high cost.

According to the present invention, a benzene hexachloride material containing at least two of the benzene hexachloride isomers is introduced into an extraction column containing a plurality of extraction stages connected in series, and there the benzene hexachloride is subjected to continuous countercurrent extraction by two immiscible liquids of different densities, each of which shows a different solubility for the isomer to be concentrated. Partition of the benzene hexachloride solute takes place between the solvents and a separation of the isomers is effected by movement of the two immiscible phases in opposite directions through the successive stages of the series. The concentrated isomers are recovered from the terminal stages after evaporation of the respective solvents.

This process of concentrating and separating isomers of benzene hexachloride by continuous liquid-liquid extraction is relatively simple compared to the prior art processes. For example, it requires a relatively few equipment items, and the continuous manner of operation provides a process easily adapted to automatic control with a resulting low man-power requirement and hence low-cost products. Moreover, the extraction processes are extremely flexible and many process variables, such as particular solvents, solvent ratio, and the use of more than one extraction column can be controlled so that any particular isomer of any degree of purity can be separated. "Separating isomers" as the term is used above and throughout this specification means that the concentration of the isomers in relation to each other has been substantially altered, and may, but does not necessarily, mean absolute separation.

In one method of operation of this invention, the extraction solvents—for example, nitromethane and normal hexane—are introduced continuously into opposite ends of a Scheibel liquid-liquid countercurrent extraction column. Details of this particular extraction apparatus are presented in U.S. Patent 2,493,265. Nitromethane is introduced at the top of the Scheibel column, while normal hexane is introduced at the bottom of the column. A mixture of benzene hexachloride isomers, for example the benzene hexachloride material containing approximately 36% of the gamma isomer, produced by the process of La Lande et al., U.S. Patent 2,569,677, is introduced into the extraction column at approximately the middle stage, the exact position depending on the type and degree of separation desired.

After the column has been put into operation and equilibrium conditions have been obtained, a normal hexane stream (i.e. a liquid in which normal hexane is the predominant solvent) is removed at the top of the Scheibel column and a nitromethane stream (i.e. a liquid in which nitromethane is the predominant solvent) is removed at the bottom of the column. The benzene hexachloride solute recovered from the normal hexane terminal liquid contains approximately 54% of the gamma isomer, 46% alpha isomer, and no beta isomer, while the benzene hexachloride solute recovered from the nitromethane terminal liquid is essentially all beta isomer. Concentrations of alpha isomer as used throughout this specification include small amounts of the overchlorinate materials and, similarly, beta isomer concentrations include minor amounts of delta, epsilon, and zeta isomers. By "terminal" as the word is used above, and the meaning it is understood to have throughout this specification, is meant that stage at which a liquid stream is withdrawn from the extraction apparatus and it may or may not be an end stage of the apparatus.

In a Scheibel continuous liquid-liquid extraction column, my preferred apparatus, each extraction stage consists of an agitating zone and a coalescing or calming zone. The intimate mixing of the benzene hexachloride with the nitromethane and normal hexane is preferably obtained by means of propellers in the agitating zones mounted on a central shaft extending through the column. The blades on the agitators are pitchless, being vertically mounted to produce intimate mixing without imparting either an upward or downward thrust on the liquid mixture, thereby facilitating the separation of the liquids by gravity. Above and below the mixing zone are layers of fibrous packing, preferably, of the self-supporting type as, for example, a roll of tubular knitted wire mesh. The packing stops the circular motion of the liquids, coalesces the dispersed phases, which thereupon separate into layers whereby partition of the solute takes place with the liquid of the higher density nitromethane solution being on the bottom. The heavier nitromethane solution, which settles out in the lower part of the packing, flows downward countercurrently to and through a rising stream of the lighter normal hexane solution. Similarly, in the upper layer of packing the rising stream of the lighter normal hexane solution flows countercurrently to and through a descending stream of the heavier liquid.

While the preferred apparatus for practicing this invention is the Scheibel apparatus described above, it is to be understood that the process will operate in a packed column or other suitable multistage extraction apparatus wherein the approximate movement of liquids can be maintained to obtain both intimate contact and resulting partition of the benzene hexachloride isomers between two or more liquid solvents, and progression of two or more immiscible liquids of different density of different localities, by the force of gravity, centrifugal force, or other means.

Satisfactory solvents for the extraction process must be able to dissolve the benzene hexachloride isomers. Secondly, the relative solubilities of at least two isomers which it is desired to separate must be different in each of the pair of solvents. Thirdly, the solvent phases must be immiscible in the presence of benzene hexachloride isomers and of a sufficient difference in density to separate readily by the force of gravity or equivalent force so that partition of the solute takes place. "Immiscible" as the term is used above, and throughout this specification, means that the liquids have only a limited solubility in each other, not that they are absolutely insoluble in each other. It is also important in the selection of extraction solvents that properties conducive to the formation of stable emulsions must be essentially lacking. It is also desirable that the solvents be of a relatively low boiling point and low molecular weight for economical recovery operations.

The preferred liquids for this extraction process are normal hexane, which is the lighter solvent (density 0.660–20°/4°), and nitromethane, the heavier solvent (density 1.13–20°/4°). The nitromethane is admitted to the top of an extraction unit through a suitable entry-port and moves downward in the column countercurrent to the rising normal hexane phase and is withdrawn from a position near the bottom of the column. The normal hexane is pumped into the extraction column at or near the bottom terminal stage and percolates up the column and is removed from the column at or near the top terminal stage. Another pair of solvents which vary in density and in their solubilities for benzene hexachloride isomers, which can be used successfully in this invention, are normal hexane (density 0.660–20°/4°) and acetonitrile (density 0.783–20°/4°). Similarly cyclohexane-acetonitrile and cyclohexane-methanol are solvent pairs useful in practicing this invention. It is to be understood that similar solvents with smaller properties, although not herein described, may be used to practicing the subject invention. It is essential to the successful operation of the extraction process that suitable temperature and pressure conditions be chosen so that the solvents are at all times in the liquid state when they are in the extraction columns.

The entrance of the benzene hexachloride feed material may be to any stage of the column depending on the particular feed composition, the product desired, and on the identity and flow rates of the particular solvents being used. Usually the benzene hexachloride feed location will be at or near the middle extraction stage. Benzene hexachloride may be fed to the column undiluted either as a granular solid or as a molten liquid. Or the benzene hexachloride may be introduced with either one of the extraction solvents in solution or as a slurry.

The benzene hexachloride feed material may be the total chlorination product resulting from the addition chlorination of benzene; it may be a benzene hexachloride material containing an enhanced proportion of gamma isomer; it may be a material containing gamma isomer and only one other stereo isomer of benzene hexachloride, such as may be produced as an intermediate product in this invention; or it may be a material containing the beta and other isomers without any appreciable amounts of gamma isomer being present. Preferably, the feed material to this process is a gamma concentrate material containing principally 30 to 50% of the gamma isomer, 47 to 34% of the alpha isomer, 23 to 16% of the beta isomer, and lesser amounts of the other isomers and over-chlorinates. Another preferred feed is the approximately half alpha and half gamma mixture which can be obtained as one of the products of a countercurrent extraction of such a gamma concentrate. This product, used as the feed in a second extraction can give an almost complete separation of its two principal components, the alpha and gamma isomers. In general, solute recovered from an extraction unit, as described in this invention, wherein the ratio of the isomers has been substantially altered from the ratio in the feed material or wherein even one of the feed isomers has been entirely eliminated, may suitably form the feed material for a second multi-stage extraction unit.

Apparatus auxiliary to the extraction column useful for the operation of this process includes storage tanks for the extraction solvents, the benzene hexachloride feed, and the liquid product solutions; feed pumps for moving the various materials through the columns; evaporators and condensors for separation and recovery of solvents; and flow meters, pressure gauges, temperature gauges, and automatic control devices necessary to insure the uninterrupted flow of material; all these are well known in the art for use with an extraction column.

The following examples illustrate but do not limit the invention:

*Example 1*

Benzene hexachloride containing 38.8% alpha, 21.0% beta, 33.4% gamma and small amounts of other isomers and overchlorinates was introduced continuously at a rate of 98.4 grams per hour in a molten state to a 1″ Scheibel column containing 52 stages at the 26th stage from the bottom. Normal hexane was introduced at the bottom of the column at a rate of 7.34 liters per hour; nitromethane was introduced at the top of the column at a rate of 0.66 liter per hour. The solubilities of the principal benzene hexachloride isomers in the nitromethane, expressed as grams per 100 milliliters of solvent, are as follows: alpha 5.79, beta 1.40, and gamma 30.1; while the solubilities in normal hexane are: alpha 0.885, beta 0.281, and gamma 2.29. After equilibrium conditions had been established, the normal hexane terminal liquid removed from near the top of the column contained 9.18 grams per liter of benzene hexachloride isomers which analyzed 54.0% gamma, 0% beta, with the remainder being alpha and overchlorinates. The nitromethane terminal liquid removed from near the bottom of the column contained 43 grams per liter of benzene hexachloride isomers which analyzed essentially beta, along with small amounts of delta and epsilon isomers.

*Example 2*

Benzene hexachloride containing 35.3% alpha, 17.0% beta, and 34.6% gamma, the remainder being other isomers and overchlorinates, was introduced continuously at a rate of 152 grams per hour as a solution in 228 milliliters per hour of nitromethane, into a 1″ Scheibel column containing 14 stages at the 6th stage from the bottom. Normal hexane was introduced at the bottom of the column at a rate of 5.48 liters per hour; nitromethane was introduced at the top of the column at a rate of 1.5 liters per hour. After equilibrium conditions had been established, the normal hexane terminal liquid removed from near the top of the column contained 5.45 grams per liter of benzene hexachloride isomers which analyzed 9.7% gamma, 0% beta, and 78% alpha and overchlorinates. The nitromethane terminal liquid removed from near the bottom of the column contained 81.6 grams per liter of benzene hexachloride isomers which analyzed 42.7% gamma, 26.3% alpha, and 23.2% of a fraction consisting principally of beta, and small amounts of delta and epsilon.

*Example 3*

Benzene hexachloride containing 51.5% alpha, 0% beta, and 43.8% gamma was introduced continuously at a rate of 49.8 grams per hour as a solution in 49.8 milliliters per hour of nitromethane, into a 1″ Scheibel column containing 52 stages at the 26th stage from the bottom. Normal hexane was introduced at the bottom of the column at a rate of 5.83 liters per hour; nitromethane was introduced at the top of the column at a rate of 1.17 liters per hour. After equilibrium conditions had been established, the normal hexane terminal liquid removed from near the top of the column contained 2.46 grams per liter of benzene hexachloride isomers which analyzed 95.3% alpha, 0% beta, and 1.65% gamma. The nitromethane terminal liquid removed from near the bottom of the column contained 31.4 grams per liter of benzene hexachloride isomers which analyzed 12.6% alpha, 0% beta, and 83.7% gamma.

*Example 4*

Benzene hexachloride containing about 54% alpha, 0% beta, and about 47% gamma was introduced continuously at a rate of 54 grams per hour as a solution in 40 milliliters per hour of nitromethane into a 1″ Scheibel column containing 52 stages at the 26th stage from the bottom. Normal hexane was introduced at the bottom of the column at a rate of 5.91 liters per hour; nitromethane was introduced at the top of the column at a rate of 1.09 liters per hour. After equilibrium conditions had been established, normal hexane terminal liquid removed from near the top of the column contained 2.24 grams per liter of benzene hexachloride isomers which analyzed 90.5% alpha, 0% beta, and 1.4% gamma. The nitromethane terminal liquid removed from near the bottom of the column contained 25 grams per liter of benzene hexachloride isomers which analyzed 10.3% alpha, 0% beta, and 89.6% gamma.

In the above descriptions of the processes, the benzene hexachloride was introduced to the extraction units as a solution in one of the extraction solvents and as a molten solid. The procedures of the above examples of separating the stereo-isomers of benzene hexachloride are equally effective if the isomers are fed to the extraction apparatus as a slurry in one of the solvents or as a finely divided powder. Similarly, while the above examples show the use of a Scheibel extraction column as the preferred form of a continuous countercurrent liquid-liquid extraction apparatus, other types of multistage continuous extraction apparatus as, for example, a packed column, can also be used in carrying out the above-described procedures of the examples. The solvent pairs used in the examples were normal hexane and nitromethane. Other solvent pairs such as normal hexane and acetonitrile, cyclohexane and acetonitrile, cyclohexane and methyl alcohol, each of which pairs forms two immiscible solutions of the benzene hexachloride isomers of different densities and which solvents have a different solubility for the particular isomer to be separated, can also be used in the continuous liquid-liquid extraction processes, as described in the above examples.

Having thus described my invention, I claim:

1. A method of preparing compositions containing gamma benzene hexachloride from a mixture of benzene hexachloride isomers including the gamma and delta isomers which comprises establishing a zone containing a pair of oppositely moving streams of immiscible benzene hexachloride solvents, one of said streams comprising nitromethane and the other comprising normal hexane, introducing said mixture of benzene hexachloride isomers into said zone and dissolving said benzene hexachloride in the said solvents, the gamma isomer selectively distributing in the normal hexane.

2. The method of separating benzene hexachloride isomers from a benzene hexachloride feed material containing at least 2 stereoisomers of benzene hexachloride comprising establishing a zone containing a pair of oppositely-moving streams of immiscible benzene hexachloride solvents, one of said streams comprising nitromethane and the other stream comprising n-hexane, introducing said mixture of benzene hexachloride isomers into said zone and dissolving said benzene hexachloride in the said solvents, the benzene hexachloride isomers selectively distributing in the said solvents.

References Cited in the file of this patent

UNITED STATES PATENTS

| | | |
|---|---|---|
| 2,438,900 | Cooke et al. | Apr. 6, 1948 |
| 2,493,265 | Scheibel | Jan. 3, 1950 |